US012785606B2

(12) United States Patent
Namuduri et al.

(10) Patent No.: US 12,785,606 B2
(45) Date of Patent: Nov. 3, 2026

(54) INVERTER ASSEMBLY INCLUDING HARD-SWITCHING AND RESONANT SWITCHING FOR DRIVING A MOTOR

(71) Applicant: GM GLOBAL TECHNOLOGY OPERATIONS LLC, Detroit, MI (US)

(72) Inventors: Chandra S. Namuduri, Troy, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 134 days.

(21) Appl. No.: 18/894,504

(22) Filed: Sep. 24, 2024

(65) Prior Publication Data

US 2026/0088749 A1 Mar. 26, 2026

(51) Int. Cl.

| | |
|---|---|
| ***H02P 27/08*** | (2006.01) |
| ***B60L 3/12*** | (2006.01) |
| ***H02P 23/00*** | (2016.01) |
| ***H02P 23/14*** | (2006.01) |
| ***H02P 27/10*** | (2006.01) |

(52) U.S. Cl.

CPC .............. *H02P 27/085* (2013.01); *B60L 3/12* (2013.01); *H02P 23/0027* (2013.01); *H02P 23/14* (2013.01); *H02P 27/10* (2013.01); *B60L 2210/44* (2013.01)

(58) Field of Classification Search

CPC .... H02P 27/085; H02P 23/0027; H02P 23/14; H02P 27/10; B60L 3/12; B60L 2210/44

USPC .......................................................... 318/139

See application file for complete search history.

(56) References Cited

U.S. PATENT DOCUMENTS

| | | | | |
|---|---|---|---|---|
| 4,833,584 | A * | 5/1989 | Divan | H02M 7/538 363/37 |
| 2010/0080028 | A1* | 4/2010 | Cheng | H02M 5/4585 363/126 |
| 2014/0265979 | A1* | 9/2014 | Xu | H02P 6/34 318/478 |
| 2017/0353138 | A1* | 12/2017 | Zhang | H02P 27/06 |
| 2018/0194236 | A1* | 7/2018 | Elshaer | B60L 53/12 |
| 2018/0287601 | A1* | 10/2018 | Yang | H03K 17/041 |
| 2019/0200441 | A1* | 6/2019 | Zhu | H02M 3/3376 |
| 2022/0103111 | A1* | 3/2022 | Jaksic | H02P 3/22 |
| 2025/0058661 | A1* | 2/2025 | Namuduri | B60L 53/22 |

* cited by examiner

*Primary Examiner* — Gabriel Agared

(74) *Attorney, Agent, or Firm* — CANTOR COLBURN LLP

(57) ABSTRACT

A system for driving an electric motor includes an inverter assembly including a main inverter circuit and an auxiliary circuit, the auxiliary circuit being a resonant circuit having a set of auxiliary switches and an inductor connected to each phase of the motor. The system includes a controller configured to control the inverter assembly according to one of a normal mode and a resonant mode. The controller operates the main inverter circuit to drive the electric motor when in the normal mode, and the controller controls the auxiliary circuit to control switching of the main inverter circuit when in the resonant mode. The controller is configured to control the inverter assembly according to the normal mode based on a load current being greater than or equal to a selected current threshold, and control the inverter assembly according to the resonant mode based on the load current being below the threshold.

20 Claims, 5 Drawing Sheets

INVERTER ASSEMBLY INCLUDING HARD-SWITCHING AND RESONANT SWITCHING FOR DRIVING A MOTOR

INTRODUCTION

The subject disclosure relates to electric motors, and more specifically, to power inverters used to drive electric motors.

An electric or hybrid vehicle employs one or more electric motors for propulsion, and typically includes a power inverter to drive the electric motor(s). A power inverter functions to transform direct current (DC) power to alternating current (AC) and modulate current supplied to each phase of an electric motor. A modulation scheme such as pulse width modulation (PWM) is used to control switching in an inverter. It is desirable to improve inverter systems to, for example, reduce losses and more efficiently drive electric motors.

SUMMARY

In one exemplary embodiment, a system for driving an electric motor includes an inverter assembly including a main inverter circuit and an auxiliary circuit, the auxiliary circuit being a resonant circuit having a set of auxiliary switches and an inductor connected to each phase of the electric motor. The system also includes a controller configured to control the inverter assembly according to one of a normal mode and a resonant mode. The controller operates the main inverter circuit to drive the electric motor when the system is in the normal mode, and the controller controls the auxiliary circuit to control switching of the main inverter circuit when the system is in the resonant mode. The controller is configured to control the inverter assembly according to the normal mode based on a load current being greater than or equal to a selected current threshold, and the controller is configured to control the inverter assembly according to the resonant mode based on the load current being below the selected current threshold.

In addition to one or more of the features described herein, the main inverter circuit is operated as a hard-switching inverter circuit in the normal mode.

In addition to one or more of the features described herein, the main inverter circuit includes a set of first switches connected to each phase of the electric motor, and a switch capacitor in parallel with each first switch of the set of first switches.

In addition to one or more of the features described herein, a size of at least one of the inductor, the switch capacitor and the set of auxiliary switches is selected so that a resonant commutation cycle occurs within a selected dead time.

In addition to one or more of the features described herein, each switch of the set of auxiliary switches has a first size, and each first switch of the set of first switches has a second size, the first size being less than the second size.

In addition to one or more of the features described herein, the controller is configured to control the inverter assembly based on an operating envelope, the operating envelope indicating a maximum torque generated by the electric motor as a function of a motor speed.

In addition to one or more of the features described herein, the controller is configured to control the inverter assembly according to the resonant mode based on a motor torque and the motor speed being within a downsized operating envelope, the downsized operating envelope being smaller than the operating envelope.

In addition to one or more of the features described herein, the electric motor is part of a vehicle.

In another exemplary embodiment, a method of driving an electric motor includes controlling an inverter assembly to supply electric power to the electric motor during a drive cycle, the inverter assembly including a main inverter circuit and an auxiliary circuit, the auxiliary circuit configured to be operated to cause resonant switching of the main inverter circuit, the auxiliary circuit having a set of auxiliary switches and an inductor connected to each phase of the electric motor. The method includes monitoring one or more parameters of the inverter assembly, the one or more parameters including a load current. The method also includes, during the drive cycle, comparing the load current to a selected current threshold, based on the load current being greater than or equal to a selected current threshold, controlling the inverter assembly according to a normal mode in which a controller operates the main inverter circuit to drive the electric motor, and based on the load current being less than the selected current threshold, controlling the inverter assembly according to a resonant mode in which the controller controls the auxiliary circuit to cause resonant switching of the main inverter circuit to drive the electric motor.

In addition to one or more of the features described herein, the main inverter circuit is configured as a hard-switching inverter circuit.

In addition to one or more of the features described herein, the main inverter circuit includes a set of first switches connected to each phase of the electric motor, and a switch capacitor in parallel with each first switch of the set of first switches.

In addition to one or more of the features described herein, a size of at least one of the inductor, the switch capacitor and the set of auxiliary switches is selected so that a resonant commutation cycle occurs within a selected dead time.

In addition to one or more of the features described herein, the inverter assembly is controlled based on an operating envelope, the operating envelope indicating a maximum torque generated by the electric motor as a function of motor speed.

In addition to one or more of the features described herein, the inverter assembly is controlled according to the resonant mode based on a motor torque and the motor speed being within a downsized operating envelope, the downsized operating envelope being smaller than the operating envelope.

In addition to one or more of the features described herein, the electric motor is part of a vehicle.

In yest another exemplary embodiment, a vehicle system includes a memory having computer readable instructions, and a processing device for executing the computer readable instructions, the computer readable instructions controlling the processing device to perform a method. The method includes controlling an inverter assembly of a vehicle to supply electric power to an electric motor during a drive cycle, the inverter assembly including a main inverter circuit and an auxiliary circuit, the auxiliary circuit being a resonant circuit having a set of auxiliary switches and an inductor connected to each phase of the electric motor. The method also includes monitoring one or more parameters of the inverter assembly, the one or more parameters including a load current, during the drive cycle, comparing the load current to a selected current threshold, based on a load current being greater than or equal to a selected current threshold, controlling the inverter assembly according to a normal mode in which a controller operates the main inverter circuit to drive the electric motor, and based on the load current being less than the selected current threshold, controlling the inverter assembly according to a resonant mode in which the controller controls the auxiliary circuit to achieve resonant switching of the main inverter circuit to drive the electric motor.

In addition to one or more of the features described herein, the main inverter circuit is configured as a hard-switching inverter circuit and includes a set of first switches connected to each phase of the electric motor, and a switch capacitor in parallel with each first switch of the set of first switches.

In addition to one or more of the features described herein, a size of at least one of the inductor, the switch capacitor and the set of auxiliary switches is selected so that a resonant commutation cycle occurs within a selected dead time.

In addition to one or more of the features described herein, the inverter assembly is controlled based on an operating envelope, the operating envelope indicating a maximum torque generated by the electric motor as a function of a motor speed.

In addition to one or more of the features described herein, the inverter assembly is controlled according to the resonant mode based on a motor torque and the motor speed being within a downsized operating envelope, the downsized operating envelope being smaller than the operating envelope.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
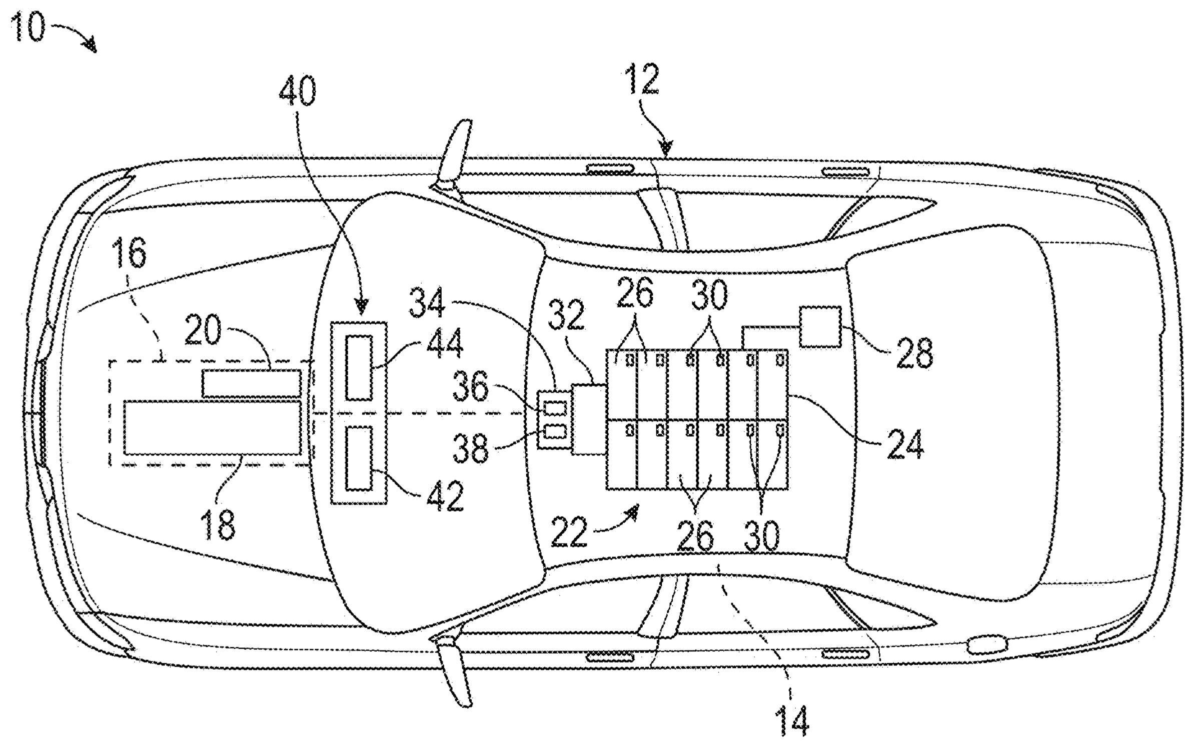
FIG. 1 is a top view of a motor vehicle including a battery system and an inverter system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, methods, devices and systems are provided for driving an electric motor. An embodiment of a drive system includes an inverter assembly having a multi-phase bridge circuit across a direct current (DC) bus, and an auxiliary circuit connected to each phase of the multi-phase bridge circuit. The auxiliary circuit is a resonant circuit having a set of auxiliary switches and an inductor connected to each phase of the electric motor. Components of the auxiliary circuit are selected so that zero-voltage switching is enabled.

In an embodiment, the inverter assembly is configured to operate in multiple control modes, which include a normal mode and a resonant mode. In the normal mode, the main inverter circuit (also referred to as a main inverter or a primary inverter) is operated by a controller via hard switching to drive the motor. In the resonant mode, the auxiliary circuit is operated to drive the motor using resonant or "soft" switching. The controller may be configured with a desired level of hysteresis to achieve a smooth transition between modes. In an embodiment, the inverter assembly is operated in the normal mode based on a load current or other parameter being greater than or equal to a selected current threshold (or other parameter threshold), and is operated in the resonant mode based on the load current being below the selected current threshold.

In an embodiment, the primary inverter includes a capacitor connected to each switch therein (referred to as primary switches), which functions so that the primary switches are switched at zero voltage. Soft switching at the auxiliary circuit also occurs at zero voltage. In this way, zero-voltage switching is provided for throughout an operating region.

In an embodiment, the inverter assembly is controlled based on an operating region or envelope, such as a torque-speed envelope. A "downsized" operating envelope is provided, which is smaller than the operating envelope. The inverter assembly is controlled according to the normal mode when a parameter (e.g., motor torque or current) is within the operating envelope but outside of the downsized operating envelope. In an embodiment, when the parameter is within the downsized operating envelope, the inverter assembly is controlled according to the resonant mode. In an embodiment, the downsized operating envelope includes a buffer region, and the inverter assembly is controlled according to the resonant mode when the parameter is inside the downsized operating envelope but outside of the buffer region.

Embodiments described herein present numerous advantages and technical effects. The embodiments provide for increases in switching frequencies while keeping power loss within acceptable levels. For example, by employing resonant switching and designing resonant circuit components as described herein, high switching frequencies can be accomplished while minimizing resonant circuit power losses. Embodiments may also ensure that zero-voltage switching occurs within a desired dead time, thereby improving inverter efficiency.

Power inverters used in existing vehicle propulsion drives employ hard-switching, which is accompanied by switching losses. Accordingly, switching frequency is limited to a certain upper limit to keep the switching losses within acceptable levels. Higher switching frequency reduces motor current ripple and harmonics, which helps reduce the motor losses, but overall drive system losses may increase above a certain switching frequency due to disproportionally higher increase in the inverter switching losses.

Zero voltage switching in an inverter by employing a resonant circuit topology can enable higher switching frequencies by minimizing the switching losses, but needs additional components which add to the volume of the inverter.

Embodiments address the above limitations by employing a resonant auxiliary circuit that is employed only in a certain portion or subset of an operating region, which allows for higher switching frequencies without the need for relatively large components that would significantly increase the size of the inverter.

The embodiments are not limited to use with any specific vehicle and may be applicable to various contexts. For example, embodiments may be used with automobiles, trucks, aircraft, construction equipment, farm equipment, automated factory equipment and/or any other device or system for which additional thermal control may be desired to facilitate a device or system's existing thermal control capabilities or features.

The embodiments are not limited to use with any specific vehicle or device or system that utilizes battery assemblies, and may be applicable to various contexts. For example, the embodiments may be used with automobiles, trucks, aircraft, construction equipment, farm equipment, automated factory equipment and/or any other device or system that may use electric motors.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, a fuel injection subsystem, an exhaust subsystem and others.

The vehicle may be an electrically powered vehicle (EV) or a hybrid electric vehicle (HEV). In an example, the vehicle 10 is a hybrid vehicle that includes a combustion engine 18 and an electric motor 20.

The vehicle 10 includes a battery system 22, which may be electrically connected to the motor 20 and/or other components, such as vehicle electronics. In an embodiment, the battery system 22 includes a battery assembly such as a high voltage battery pack 24 having a plurality of battery modules 26. Each of the battery modules 26 includes a number of individual cells (not shown). The battery system 22 may also include a monitoring unit 28 configured to receive measurements from sensors 30. Each sensor 30 may be an assembly or system having one or more sensors for measuring various battery and environmental parameters, such as temperature, current and voltages. The monitoring unit 28 includes components such as a processor, memory, an interface, a bus and/or other suitable components.

The battery system 22 includes various conversion devices for controlling the supply of power from the battery pack 24 to the motor 20 and/or electronic components. The conversion devices optionally include a direct current (DC)-DC converter module 32 for adjusting direct current from the battery pack 24 when driving the electric motor 20.

The conversion devices also include an inverter module 34 that includes an inverter circuit 36 (referred to herein as an inverter 36) and a control module 38. The inverter 36 receives DC power from the battery pack 24 (optionally via the DC-DC converter 32) and converts (DC power to alternating current (AC) power that is supplied to the electric motor 20. The inverter 36 includes one or more sets of switches or switching devices (e.g., controllable semiconductor switches such as metal-oxide-semiconductor field-effect transistors (MOSFETs)) that are controllable to supply AC power to each phase of the motor 20.

The control module 38 may be a dedicated controller installed in the inverter module 36 as shown, or disposed elsewhere. The control module 38 may be an existing controller, such as the monitoring unit 28 or a computer system 40. The control module 38 (also referred to as a controller 38) can also be realized using a combination of controllers.

The computer system 40 includes one or more processing devices 42 and a user interface 44. The various processing devices and units may communicate with one another via a communication device or system, such as a controller area network (CAN) or transmission control protocol (TCP) bus.

Figure 2:
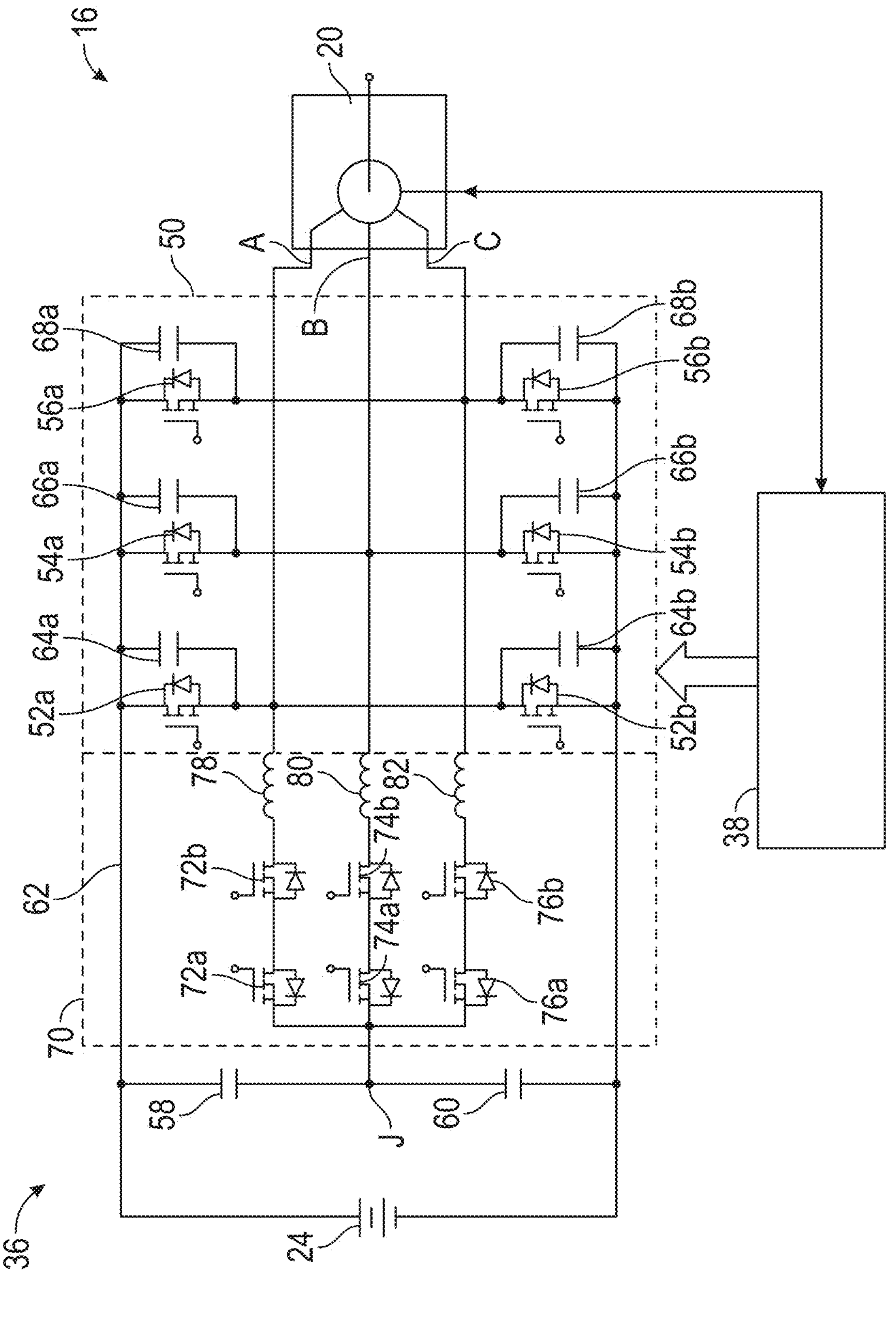
FIG. 2 depicts an inverter assembly for driving an electric motor, in accordance with an exemplary embodiment.

FIG. 2 depicts components of the propulsion system 16 and the battery pack 24, including components of an embodiment of the inverter 36. The propulsion system 16 includes the inverter 36 coupled to the motor 20. Components of the inverter 36 are controlled by the control module 38 to apply AC current to the motor 20.

The inverter 36, in an embodiment, is a multi-phase inverter. Although the inverter 36 is discussed as a three-phase inverter, embodiments are not so limited, as the inverter 36 can be configured for any suitable number of phases.

In an embodiment, the inverter 36 is a three-phase inverter configured to drive the motor 20, which is a three-phase motor having phases A, B and C. The inverter 36 includes a main or primary circuit (denoted as a primary inverter 50) and a second or auxiliary circuit 70 (denoted as an auxiliary circuit 70).

The primary inverter 50 is a "hard-switching" inverter (referred to as a main inverter 50), and the addition of the auxiliary circuit 70 enables soft-switching of the main inverter 50. In hard switching, there are switching losses both at turn-on and turn-off of a switch. During a turn-on event, the current rises linearly while the voltage drops linearly, and the opposite happens during a turn-off event.

The auxiliary circuit 70 enables "soft-switching" of the primary (main) inverter 50, in which an inductor-capacitor (LC) resonant circuit provides for switching at zero voltage ("zero voltage switching" or ZVS). Soft switching results in zero voltage switching in the main inverter, and typically results in significantly less switching loss than hard switching.

The primary or main inverter 50 and the auxiliary circuit 70 are connected to the battery pack 24 by a propulsion bus 62. Switching assemblies in both the main inverter 50 and the auxiliary circuit 70 are electrically connected to phases of the motor by conductors or leads A, B and C.

Any suitable device may be employed as a switch. For example, the switches can include transistors such as Silicon (Si) insulated gate bipolar transistors (IGBTs), and field-effect transistors (FETs). Examples of FETs include metal-oxide-semiconductor FETs (MOSFETs), Si MOSFETs, silicon carbide (SiC) MOSFETs, gallium nitride (GaN) high electron mobility transistors (HEMTs), and SiC junction-gate FETs (JFETs). Other examples of switches that can be used include diamond, gallium oxide and other wide band gap (WBG) semiconductor-based power switch devices.

As discussed further herein, the auxiliary circuit 70 is utilized to achieve soft switching of the main inverter 50. In an embodiment, the auxiliary circuit 70 is activated (to cause the main inverter 50 to soft switch) when one or more parameters of the inverter 36 is/are within a portion of an operating range or operating envelope. Outside of the portion of the operating envelope, the auxiliary circuit 70 is disabled so that the main inverter 50 will operate in a normal (hard switching) mode. As such, components of the auxiliary circuit 70 do not need to be able to handle all potential current and torque levels. Accordingly, resonant components can be of a smaller size than the primary components. Resonant circuit component sizes can be reduced (relative to primary circuit component sizes) by an order of magnitude, while achieving high switching frequency (e.g., pulse width modulation switching frequency) and maintaining high inverter efficiency, which improves the overall system efficiency over predetermined operating points.

As described herein, "size" may refer to a physical size or volume, or refer to a parameter level that a switch or component is rated for or capable of handling. For example, one switch having a higher voltage and/or current rating than another switch is considered to have a greater size. A capacitor's size may refer to the capacitors rating or maximum capacitance.

Switches in the auxiliary circuit 70 may be rated significantly lower (i.e., have a lower voltage and current rating) than switches in the primary inverter 50. For example, the primary inverter switches are IGBTs (or other semiconductor switches that have a relatively high rating and relatively low operating frequency range), and the auxiliary circuit 70 includes GaN switches (or other semiconductor switches that have a relatively low rating and relatively high operating frequency range). An example of a GaN switch is a monolithic bidirectional GaN-on-Si switch.

In an embodiment, the primary inverter 50 is a three-phase inverter connected to the battery pack 24 via the DC propulsion bus 62. The primary inverter 50 includes three sets of switches (referred to as primary switches) connected in parallel to one another and connected to the battery pack 24 and the motor 20. Each set of primary switches is in a half-bridge configuration. A first set of primary switches 52*a* and 52*b* (S1 and S4) is connected to a first motor phase (phase A), a second set of primary switches 54*a* and 54*b* (S3 and S6) is connected to a second motor phase (phase B), and a third set of primary switches 56*a* and 56*b* (S5 and S2) is connected to a third motor phase (phase C).

The inverter 36 also includes a set of capacitors 58 and 60, which are connected to the DC propulsion bus 62 in parallel with the primary inverter 50 and the auxiliary circuit 70. The capacitors 58 and 60 function to maintain consistent voltage levels and power outputs, and filter out the ripple current.

Each primary switch in the primary inverter 50 is connected in parallel to a respective capacitor (referred to as a "switch capacitor"). For example, the primary switch 52*a* is connected in parallel to the DC propulsion bus 62 by a switch capacitor 64*a*, and the primary switch 52*b* is connected to a switch capacitor 64*b*. Likewise, primary switches 54*a* and 54*b* are connected respectively to switch capacitors 66*a* and 66*b*, and primary switches 56*a* and 56*b* are connected respectively to switch capacitors 68*a* and 68*b*.

The auxiliary circuit 70 is a resonant circuit that includes a set of auxiliary switches and an inductor connected to each motor phase. The auxiliary circuit 70 forms an LC resonant circuit for turning switches on and off, having capacitance provided by the switch capacitors 64*a*, 64*b*, 66*a*, 66*b*, 68*a* and 68*b* and inductance provided by inductors 78, 80 and 82.

In an embodiment, the auxiliary circuit 70 includes three sets of switches 72*a*, 72*b*, 74*a*, 74*b*, 76*a*, 76*b* (auxiliary switches) connected between a mid-point of the propulsion bus (at a junction J of the capacitors 58 and 60 and phase terminals A, B, C of the motor 20) through respective resonant inductors 78, 80 and 82. The auxiliary switches may be designed or selected to have a significantly smaller size (e.g., a smaller current rating) than the primary switches.

A first set of auxiliary switches 72*a* and 72*b* (A1 and A2) is connected to a first motor phase (phase A) via the inductor 78. A second set of auxiliary switches 74*a* and 74*b* (A3 and A4) is connected to a second motor phase (phase B) via the inductor 80, and a third set of auxiliary switches 76*a* and 76*b* (A5 and A6) is connected to a third motor phase (phase C) via the inductor 82.

The various components of the inverter 36 are designed or selected based on various considerations. Generally, the components are designed such that the primary switches 52*a*, 52*b*, 54*a*, 54*b*, 56*a* and 56*b* can achieve zero-voltage switching (switching at a zero-voltage condition), while keeping resonant component losses to a minimum. In addition, components are designed so that a full commutation cycle commences and completes within a desired dead time.

Examples of design considerations include component sizes, commutation time, peak current ratings, and power losses in resonant components. For example, the components are designed so that a full resonant commutation cycle occurs within a desired maximum dead time. A "dead time" refers to a delay between turning off one switch connected to a phase leg (e.g., the switch 52*a*) and turning on another switch (e.g., the switch 52*b*) connected to the phase leg during a drive cycle.

For example, because the auxiliary circuit 70 is operated only during the switching instants (turn-on and turn-off events) in the main inverter 50, components therein can be a smaller size than the primary inverter components. For example, the auxiliary switches 72*a*, 72*b*, 74*a*, 74*b*, 76*a* and 76*b* and the inductors 78, 80 and 82 are sized to be rated only to lower current levels (e.g., up to 600 Amps for a very short period of time, such as less than 0.1 to 1 microsecond) associated with a downsized operating region, whereas the primary switches 52*a*, 52*b*, 54*a*, 54*b*, 56*a* and 56*b* and the switch capacitors 64*a*, 64*b*, 66*a*, 66*b*, 68*a* and 68*b* are sized according to higher current levels (e.g., up to about 900 to 1000 Amp peak).

Each switch capacitor 64*a*, 64*b*, 66*a*, 66*b*, 68*a* and 68*b* in the primary inverter 50 functions like a snubber circuit to limit switch voltage. The switch capacitors each have a capacitance selected to allow for zero-voltage switching and completion of a commutation cycle within a desired dead time.

For example, when the primary switch 52*a* is turned off during a commutation cycle and the load current is sufficiently high (greater than or equal to a current threshold), current diverts to charge the switch capacitor 64*a* and discharge the switch capacitor 64*b*. Zero-voltage switching occurs for the switch 52*a* because voltage at the switch 52*a* is zero when the switch 52*a* was turned off.

However, when the primary switch 52*a* is turned off during the commutation cycle and the load current is below the current threshold, the controller 38 activates the auxiliary switches 72*a* and 72*b*, so that switching occurs at zero voltage due to the resonance circuit operation of the auxiliary circuit 70. In this way, zero voltage switching is ensured over an entire load current range (or other operating range or region).

Embodiments include methods of controlling vehicle propulsion or otherwise controlling an electric motor by an inverter assembly having a primary and auxiliary circuit as described herein. Although methods are discussed with reference to the embodiment of FIG. 2, the methods can be used in conjunction with any inversion devise or system having a primary and resonant inverter.

A method includes, during a drive cycle, operating the inverter 36 by the controller 38 to modulate current supplied to motor phases according to a desired modulation scheme. In an embodiment, the modulation scheme is a pulse width modulation (PWM) scheme.

Also, during the drive cycle, the controller 38 monitors parameters such as voltage, load current, vehicle speed, torque and/or others. One or more parameters are used to determine whether the auxiliary circuit 70 should be utilized to achieve soft switching. If the one or more parameters meet or exceed a parameter threshold, or are outside of a selected portion of an operating envelope, the controller 38 operates the primary inverter 50.

If the one or more parameters are below the parameter threshold, or are within the selected portion of the operating envelope, the controller 38 actives the auxiliary circuit 70, to achieve zero voltage switching of the main or primary inverter 50. The portion may be selected based on most frequently occurring operating points, so that resonant switching at high switching speeds is achieved.

For example, if the load current and/or torque is above a selected current threshold and/or a selected torque threshold, the controller 38 operates the primary inverter 50 in hard switching mode. If the load current and/or torque is at or below a respective threshold, the controller 38 operates the inverter in a soft switching mode, where the auxiliary circuit 70 is operated to achieve zero voltage switching of the main inverter 50 to drive the motor 20. An example of a load current threshold is 30% of a maximum load current.

Figure 3:
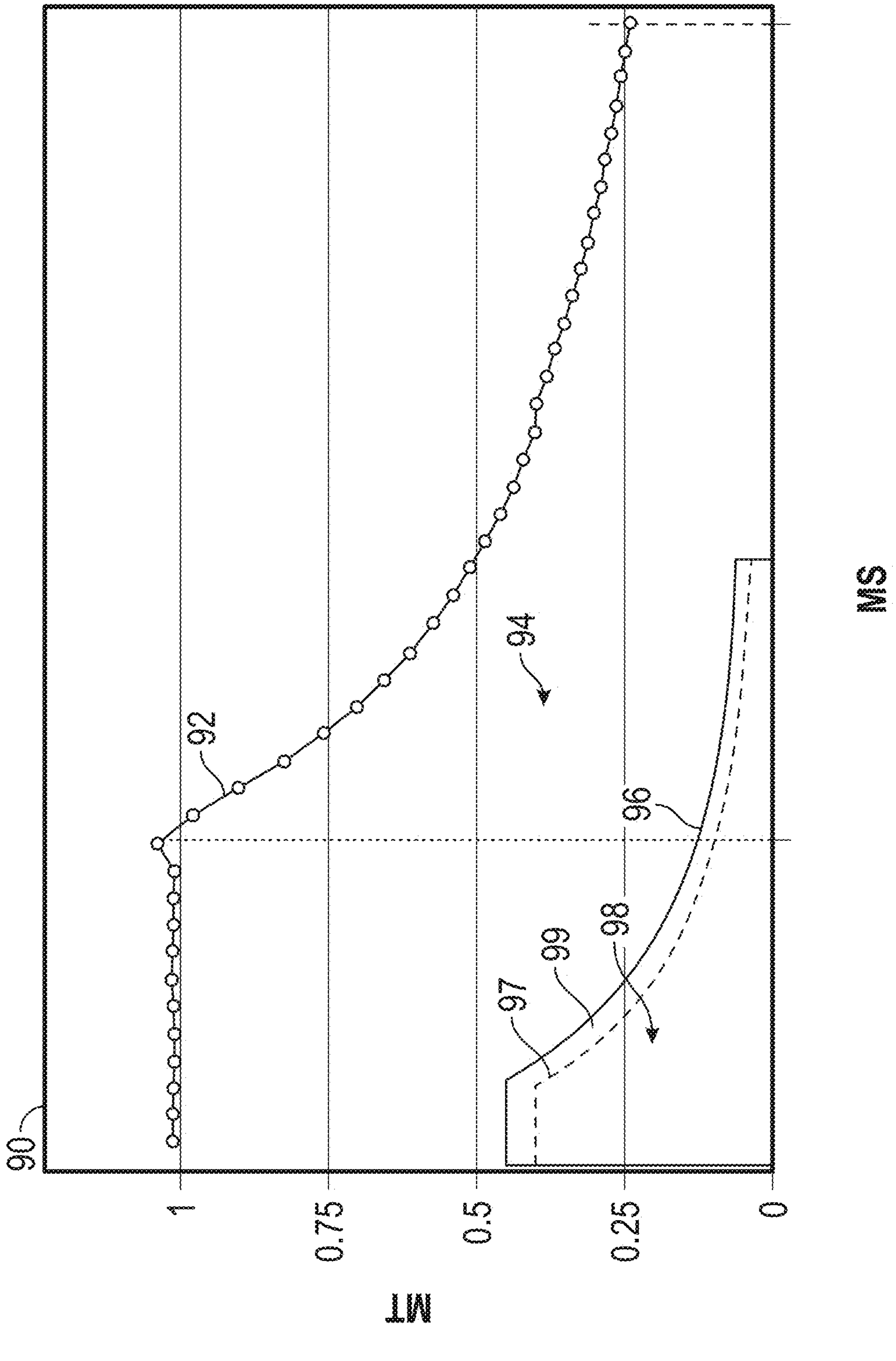
FIG. 3 depicts an example of an operating envelope, and aspects of a method of controlling an inverter based on the operating envelope, in accordance with an exemplary embodiment.

In an embodiment, the controller 38 is configured to determine the control mode to operate based on an operating envelope. FIG. 3 depicts an example of an operating envelope.

FIG. 3 shows a graph 90 of motor torque (MT) as a function of motor speed (MS). Motor torque is expressed as normalized (unitless) values representing a proportion of a maximum allowable motor torque, and motor speed is expressed in RPM.

The graph 90 includes a torque-speed curve 92 that indicates the maximum allowable torque based on motor speed, and defines the operating envelope as a peak torque envelope 94. The graph 90 also includes a torque-speed curve 96 that defines a downsized torque envelope 98.

The downsized torque envelope defines an upper limit at the curve 96, referred to as $T_{upper}$, which defines a maximum torque $T_{max}$ at each motor speed. A curve 97 may be defined that represents a lower torque $T_{lower}$, below which soft switching will be enabled by activating the auxiliary circuit 70. A region 99 between the curves 96 and 97 is referred to as a "buffer region."

As shown, the downsized torque envelope 98 is significantly smaller and covers a lower torque range. The size of the downsized torque envelope 98, in an embodiment, is selected so that the most frequently occurring torque levels are encompassed by the downsized torque envelope.

Figure 4:
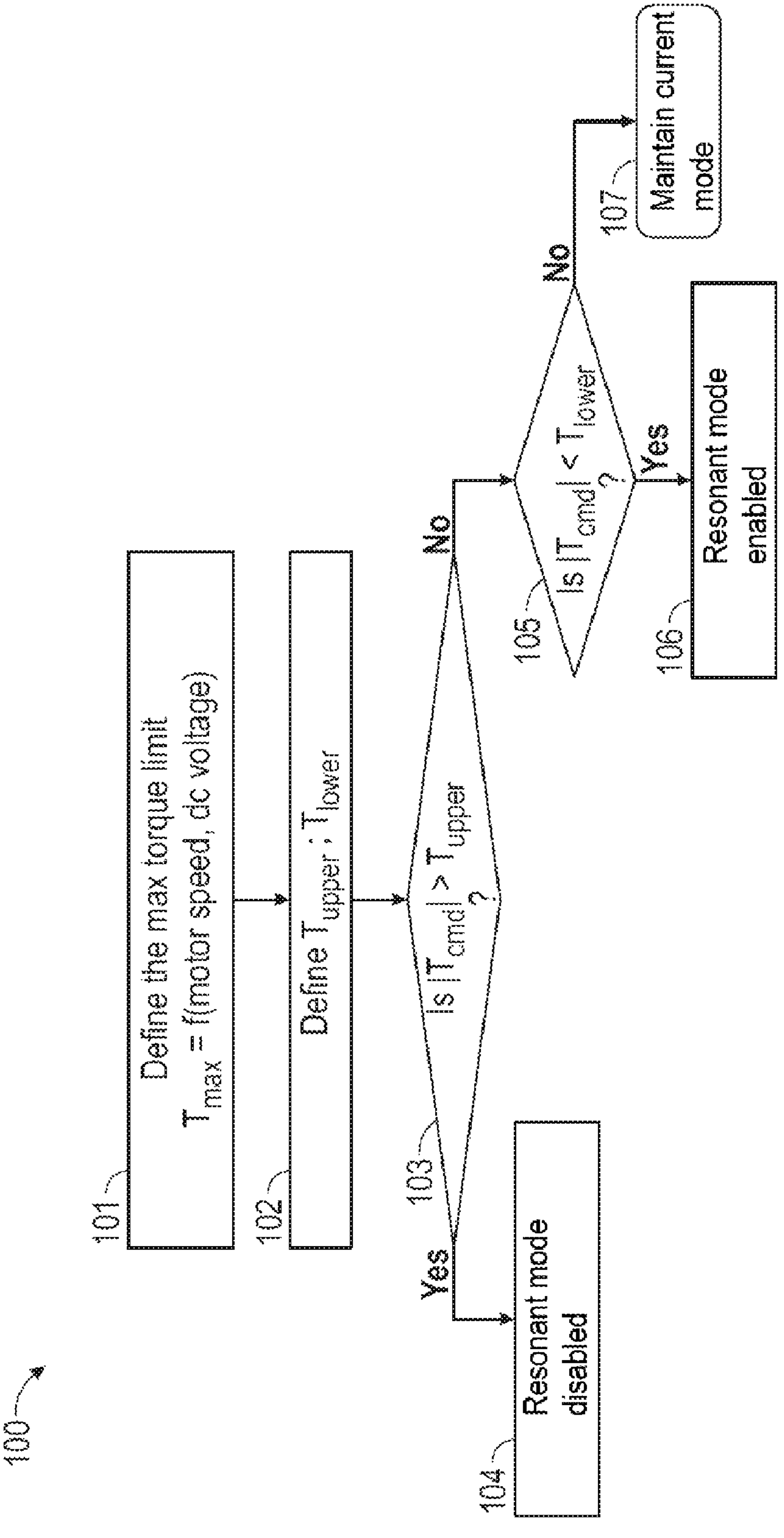
FIG. 4 is a flow diagram depicting aspects of a method of controlling an inverter to drive an electric motor, in accordance with an exemplary embodiment.

FIG. 4 illustrates embodiments of a method 100 of controlling an inverter and driving an electric motor. Aspects of the method 100 may be performed by the controller 38 or other suitable processing device.

The method 100 is described in conjunction with the vehicle 10 and components thereof, but is not so limited, as the method 100 may be performed in conjunction with any suitable vehicle or drive system.

Furthermore, the method 100 is described in conjunction with the peak torque envelope 94 and the downsized envelope 98 as shown in FIG. 3. The method 100 is not so limited and may be performed in conjunction with any suitable parameter range and/or operating region or envelope.

The method 100 includes a number of steps or stages represented by blocks 101-107. The method 100 is not limited to the number or order of steps therein, as some steps represented by blocks 101-107 may be performed in a different order than that described below, or fewer than all of the steps may be performed.

At block 101, a maximum torque $T_{max}$ is defined. The maximum torque is a function of motor speed MS and bus voltage V ($T_{max}=f(MS, V)$). For example, $T_{max}$ is defined according to the peak torque envelope 94.

At block 102, an upper torque $T_{upper}$ is defined, which is smaller than the maximum torque $T_{max}$. (e.g., about 50% of $T_{max}$) A lower torque $T_{lower}$ is also defined, which is smaller than the upper torque $T_{upper}$ (e.g., by 1-2% of $T_{upper}$).

At block 103, during propulsion of the vehicle 10, the propulsion system 16 is monitored and various parameters are detected or estimated, such as load current, voltage, vehicle speed and others. For example, an estimated torque is determined by monitoring torque commands $T_{cmd}$ provided by a vehicle system to the controller 38.

For example, a torque command $T_{cmd}$ is detected, and $T_{cmd}$ is compared to the upper torque $T_{upper}$. The controller 38 determines whether the torque command $T_{cmd}$ exceeds the upper torque $T_{upper}$.

At block 104, if an absolute value of the torque command $T_{cmd}$ is greater than the upper torque $T_{upper}$, the resonant mode is disabled. If the inverter 36 is currently being operated in the normal mode, the normal mode is maintained. If the inverter 36 is in the resonant mode, the controller 38 transitions to the normal mode.

At block 105, the controller 38 determines whether the Torque command $T_{cmd}$ is less than the lower torque $T_{lower}$. At block 106, if the absolute value of $T_{cmd}$ is less than the lower torque $T_{lower}$, the resonant mode is enabled. If the inverter 36 is currently in the resonant mode, the resonant mode is maintained. If the inverter 36 is in the normal mode, the controller 38 transitions to the resonant mode.

At block 107, if the absolute value of $T_{cmd}$ is greater than the lower torque $T_{lower}$ but less than the upper torque $T_{upper}$ (i.e., within a buffer region), no transition is needed. The controller 38 maintains whatever mode (normal or resonant) that is currently being used.

Figure 5:
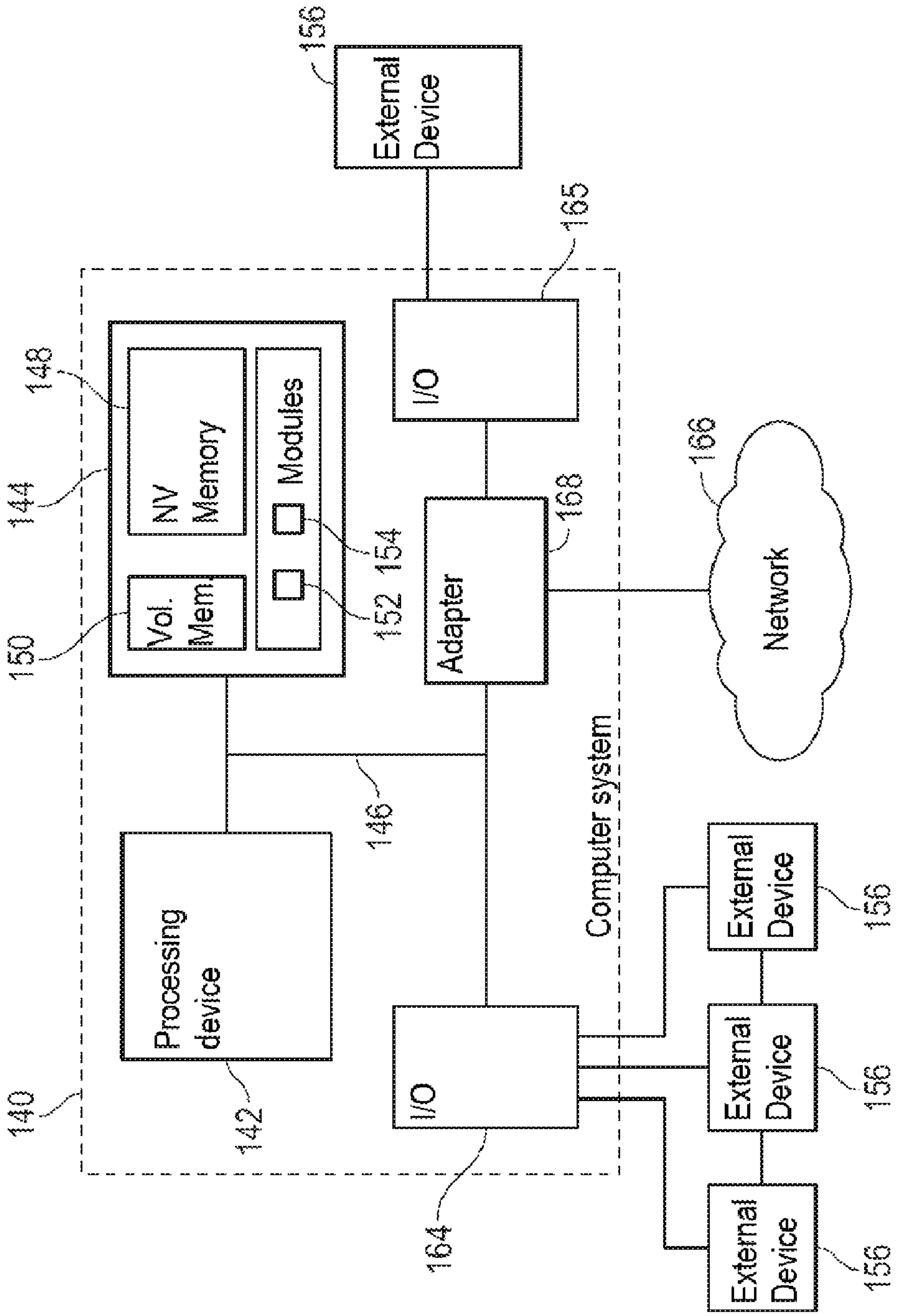
FIG. 5 depicts a computer system in accordance with an exemplary embodiment.

FIG. 5 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module 152 may be included for performing functions related to monitoring a propulsion system, and a module 154 may be included to perform functions related to controlling an inverter assembly as described herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for driving an electric motor, comprising:

an inverter assembly including a main inverter circuit and an auxiliary circuit, the auxiliary circuit being a resonant circuit having a set of auxiliary switches and an inductor connected to each phase of the electric motor; and a controller configured to control the inverter assembly according to one of a normal mode and a resonant mode, wherein the controller operates the main inverter circuit to drive the electric motor when the system is in the normal mode, and the controller controls the auxiliary circuit to control switching of the main inverter circuit when the system is in the resonant mode, and wherein:

the controller is configured to control the inverter assembly according to the normal mode based on a load current being greater than or equal to a selected current threshold, and the controller is configured to control the inverter assembly according to the resonant mode based on the load current being below the selected current threshold.

2. The system of claim 1, wherein the main inverter circuit is operated as a hard-switching inverter circuit in the normal mode.

3. The system of claim 2, wherein the main inverter circuit includes a set of first switches connected to each phase of the electric motor, and a switch capacitor in parallel with each first switch of the set of first switches.

4. The system of claim 3, wherein a size of at least one of the inductor, the switch capacitor and the set of auxiliary switches is selected so that a resonant commutation cycle occurs within a selected dead time.

5. The system of claim 3, wherein each switch of the set of auxiliary switches has a first size, and each first switch of the set of first switches has a second size, the first size being less than the second size.

6. The system of claim 1, wherein the controller is configured to control the inverter assembly based on an operating envelope, the operating envelope indicating a maximum torque generated by the electric motor as a function of a motor speed.

7. The system of claim 6, wherein the controller is configured to control the inverter assembly according to the resonant mode based on a motor torque and the motor speed being within a downsized operating envelope, the downsized operating envelope being smaller than the operating envelope.

8. The system of claim 1, wherein the electric motor is part of a vehicle.

9. A method of driving an electric motor, comprising:

controlling an inverter assembly to supply electric power to the electric motor during a drive cycle, the inverter assembly including a main inverter circuit and an auxiliary circuit, the auxiliary circuit configured to be operated to cause resonant switching of the main inverter circuit, the auxiliary circuit having a set of auxiliary switches and an inductor connected to each phase of the electric motor;

monitoring one or more parameters of the inverter assembly, the one or more parameters including a load current;

during the drive cycle, comparing the load current to a selected current threshold;

based on the load current being greater than or equal to a selected current threshold, controlling the inverter assembly according to a normal mode in which a controller operates the main inverter circuit to drive the electric motor; and based on the load current being less than the selected current threshold, controlling the inverter assembly according to a resonant mode in which the controller controls the auxiliary circuit to cause resonant switching of the main inverter circuit to drive the electric motor.

10. The method of claim 9, wherein the main inverter circuit is configured as a hard-switching inverter circuit.

11. The method of claim 10, wherein the main inverter circuit includes a set of first switches connected to each phase of the electric motor, and a switch capacitor in parallel with each first switch of the set of first switches.

12. The method of claim 11, wherein a size of at least one of the inductor, the switch capacitor and the set of auxiliary switches is selected so that a resonant commutation cycle occurs within a selected dead time.

13. The method of claim 9, wherein the inverter assembly is controlled based on an operating envelope, the operating envelope indicating a maximum torque generated by the electric motor as a function of motor speed.

14. The method of claim 13, wherein the inverter assembly is controlled according to the resonant mode based on a motor torque and the motor speed being within a downsized operating envelope, the downsized operating envelope being smaller than the operating envelope.

15. The method of claim 9, wherein the electric motor is part of a vehicle.

16. A vehicle system comprising:

a memory having computer readable instructions; and a processing device for executing the computer readable instructions, the computer readable instructions controlling the processing device to perform a method including:

controlling an inverter assembly of a vehicle to supply electric power to an electric motor during a drive cycle, the inverter assembly including a main inverter circuit and an auxiliary circuit, the auxiliary circuit being a resonant circuit having a set of auxiliary switches and an inductor connected to each phase of the electric motor;

monitoring one or more parameters of the inverter assembly, the one or more parameters including a load current;

during the drive cycle, comparing the load current to a selected current threshold;

based on a load current being greater than or equal to a selected current threshold, controlling the inverter assembly according to a normal mode in which a controller operates the main inverter circuit to drive the electric motor; and based on the load current being less than the selected current threshold, controlling the inverter assembly according to a resonant mode in which the controller controls the auxiliary circuit to achieve resonant switching of the main inverter circuit to drive the electric motor.

17. The vehicle system of claim 16, wherein the main inverter circuit is configured as a hard-switching inverter circuit and includes a set of first switches connected to each phase of the electric motor, and a switch capacitor in parallel with each first switch of the set of first switches.

18. The vehicle system of claim 17, wherein a size of at least one of the inductor, the switch capacitor and the set of auxiliary switches is selected so that a resonant commutation cycle occurs within a selected dead time.

19. The vehicle system of claim 16, wherein the inverter assembly is controlled based on an operating envelope, the operating envelope indicating a maximum torque generated by the electric motor as a function of a motor speed.

20. The vehicle system of claim 19, wherein the inverter assembly is controlled according to the resonant mode based on a motor torque and the motor speed being within a downsized operating envelope, the downsized operating envelope being smaller than the operating envelope.

* * * * *